US012763376B2

(12) United States Patent
Yamamoto et al.

(10) Patent No.: US 12,763,376 B2
(45) Date of Patent: Oct. 13, 2026

(54) NON-AQUEOUS ELECTROLYTE BATTERY

(71) Applicant: FDK CORPORATION, Tokyo (JP)

(72) Inventors: Junki Yamamoto, Tokyo (JP); Koichi Motoike, Tokyo (JP); Sho Sato, Tokyo (JP); Daisuke Hirata, Tokyo (JP); Rei Hanamura, Tokyo (JP)

(73) Assignee: FDK CORPORATION, Tokyo (JP)

( * ) Notice: Subject to any disclaimer, the term of this patent is extended or adjusted under 35 U.S.C. 154(b) by 703 days.

(21) Appl. No.: 17/961,190

(22) Filed: Oct. 6, 2022

(65) Prior Publication Data

US 2023/0137964 A1 May 4, 2023

(30) Foreign Application Priority Data

Nov. 4, 2021 (JP) ................................ 2021-179978

(51) Int. Cl.

*H01M 10/0587* (2010.01)
*H01M 10/052* (2010.01)
*H01M 50/107* (2021.01)
*H01M 50/536* (2021.01)
*H01M 50/538* (2021.01)

(52) U.S. Cl.

CPC ..... *H01M 10/0587* (2013.01); *H01M 10/052* (2013.01); *H01M 50/107* (2021.01); *H01M 50/536* (2021.01); *H01M 50/538* (2021.01)

(58) Field of Classification Search

CPC ...................... H01M 10/0422; H01M 10/0587
See application file for complete search history.

(56) References Cited

FOREIGN PATENT DOCUMENTS

| | | | | |
|---|---|---|---|---|
| JP | S60-23964 | A | | 2/1985 |
| JP | S63128567 | A | * | 6/1988 |
| JP | H09-306513 | A | | 11/1997 |
| JP | 2004199924 | A | * | 7/2004 |
| JP | 2006-139918 | A | | 6/2006 |
| JP | 2007-250414 | A | | 9/2007 |
| JP | 2009217936 | A | * | 9/2009 |
| JP | 2019-192403 | A | | 10/2019 |

OTHER PUBLICATIONS

JP 2004199924 A Machine Translation (Year: 2004).*
JP 2009217936 A Machine Translation (Year: 2009).*
JPS63128567 A Machine Translation (Year: 1988).*

* cited by examiner

*Primary Examiner* — Rebecca L Grusby
*Assistant Examiner* — Sarah J Jacobson
(74) *Attorney, Agent, or Firm* — Myers Wolin, LLC

(57) ABSTRACT

An electrode body housed, in a cylindrical battery can, in a spirally wound arrangement includes a sheet-like positive electrode, a sheet-like negative electrode, and a first separator laminate and a second separator laminate with one of the positive and negative electrodes therebetween (the negative electrode in the example of FIG. 2). Each of the first separator laminate and the second separator laminate has a layered structure including two or more separators (two in FIG. 2) welded together by a first weld region extending in a longitudinal direction along a first side and a second weld region extending in the longitudinal direction along a second side opposing the first side. The first separator laminate and the second separator laminate are welded together by a third weld region extending in the longitudinal direction along the first side and a fourth weld region extending in the longitudinal direction along the second side.

8 Claims, 9 Drawing Sheets

| | OVERLAP BETWEEN TWO TYPES OF WELD REGIONS | TEARS AND HOLES (COUNT PER 100 m) | FREE-FALL DROPS UNTIL VOLTAGE DIP (COUNT) |
|---|---|---|---|
| COMPARATIVE EXAMPLE 1 | YES | 23 | 500 |
| WORKING EXAMPLE 1 | NO | 0 | 2900 |

FIG. 4

| | SEPARATOR 6a, 7a | | | | SEPARATOR 6b, 7b | | | | WELDING BETWEEN SEPARATORS | DISCHARGE CAPACITY (mAh) | FREE-FALL DROPS UNTIL VOLTAGE DIP (COUNT) |
|---|---|---|---|---|---|---|---|---|---|---|---|
| | TYPE | MATERIAL | THICKNESS (μm) | MELTING POINT (°C) | TYPE | MATERIAL | THICKNESS (μm) | MELTING POINT (°C) | | | |
| COMPARATIVE EXAMPLE 2 | MICRO-POROUS | PE | 15 | 120 | N/A | – | – | – | – | 1550 | 500 |
| COMPARATIVE EXAMPLE 3 | MICRO-POROUS | PE | 15 | 120 | NON-WOVEN FABRIC | PP | 35 | 165 | NO | 1700 | 500 |
| WORKING EXAMPLE 1 | MICRO-POROUS | PE | 15 | 120 | NON-WOVEN FABRIC | PP | 35 | 165 | YES | 1700 | 2900 |

FIG. 5

| | WELD REGION 6c, 6d, 7c, 7d | WELD REGION 20a, 20b | ELECTROLYTE ABSORPTION RATE (cm/10min) | DISCHARGE CAPACITY (mAh) | FREE-FALL DROPS UNTIL VOLTAGE DIP (COUNT) |
|---|---|---|---|---|---|
| COMPARATIVE EXAMPLE 4 | 100% | 100% | 5 | 1700 | 2900 |
| WORKING EXAMPLE 1 | 100% | 80% | 7 | 1700 | 2900 |
| WORKING EXAMPLE 2 | 100% | 60% | 8 | 1700 | 2500 |
| WORKING EXAMPLE 3 | 100% | 40% | 11 | 1700 | 2200 |
| WORKING EXAMPLE 4 | 100% | 20% | 12 | 1700 | 900 |
| COMPARATIVE EXAMPLE 5 | 100% | 0% | 12 | 1700 | 500 |
| COMPARATIVE EXAMPLE 6 | 80% | 100% | 5 | 1700 | 2500 |
| COMPARATIVE EXAMPLE 7 | 40% | 100% | 5 | 1700 | 2300 |

FIG. 7

NON-AQUEOUS ELECTROLYTE BATTERY

CROSS-REFERENCE TO RELATED APPLICATION

This application is based upon and claims the benefit of priority of the prior Japanese Patent Application No. 2021-179978, filed on Nov. 4, 2021, the entire contents of which are incorporated herein by reference.

FIELD

The embodiment discussed herein relates to a non-aqueous electrolyte battery.

BACKGROUND

Some non-aqueous electrolyte batteries have an electrode body configured by spirally winding a sheet-like positive electrode and a sheet-like negative electrode with a sheet-like separator therebetween. Such non-aqueous electrolyte batteries are suitable for applications where large currents are used as it is easy to create more opposing area between the positive electrode and the negative electrode. However, the batteries may run out of electrolyte (non-aqueous electrolyte) in the separator when discharged at a high current and, as a result, be unable to produce sufficient current.

There are conventionally proposed batteries that include a separator configured by overlaying, on top of each other, a microporous film and a non-woven fabric capable of holding a larger amount of electrolyte than the microporous film (see, for example, Japanese Laid-open Patent Publications Nos. 2019-192403, 2006-139918, 2009-217936, 2007-250414, and 09-306513).

In such non-aqueous electrolyte batteries, if the separator fails to maintain the separation between the positive electrode and the negative electrode due to impact, vibration, anomalous heating or the like, affecting the batteries, a short circuit may occur, which could then cause heat generation or rupture. For example, polyethylene (PE) and polypropylene (PP) microporous films used as separators for lithium (Li) ion secondary batteries and lithium primary batteries are likely to readily and substantially shrink when heated or misaligned due to impact or vibration, which may lead to a short circuit.

There is a conventionally proposed spirally wound battery configured by spirally winding separators with an electrode plate of either one of the positive electrode and the negative electrode in between while heat-welding both side edges of the stacked separators in a perforated manner at regular intervals, for the purpose of preventing short circuits and improving electrolyte absorption (see, for example, Japanese Laid-open Patent Publications No. 2004-199924).

Conventional non-aqueous electrolyte batteries still have room for improvement in terms of safety and shortage of electrolyte in the separators.

SUMMARY

According to an aspect, there is provided a non-aqueous electrolyte battery including an electrode body configured to be housed, in a cylindrical battery can, in a spirally wound arrangement, wherein the electrode body includes a sheet-like positive electrode and a sheet-like negative electrode; and a first separator laminate and a second separator laminate, each of which is a layered structure including two or more separators welded to each other by a first weld region extending in a longitudinal direction along a first side and a second weld region extending in the longitudinal direction along a second side opposing the first side, the first separator laminate and the second separator laminate being welded to each other, across one of the positive electrode and the negative electrode, by a third weld region extending in the longitudinal direction along the first side and a fourth weld region extending in the longitudinal direction along the second side.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 4 represents assessment results of differences in characteristics depending on the presence or absence of overlap between two types of weld regions;

FIG. 5 represents confirmatory results of differences in characteristics depending on the number of separators and the presence or absence of welding;

FIG. 7 illustrates electrolyte absorption rate, discharge capacity, and free fall test results obtained by varying the lengths of the two types of weld regions in the longitudinal direction;

DESCRIPTION OF EMBODIMENTS

An embodiment will be described below with reference to the accompanying drawings.

Figure 1:
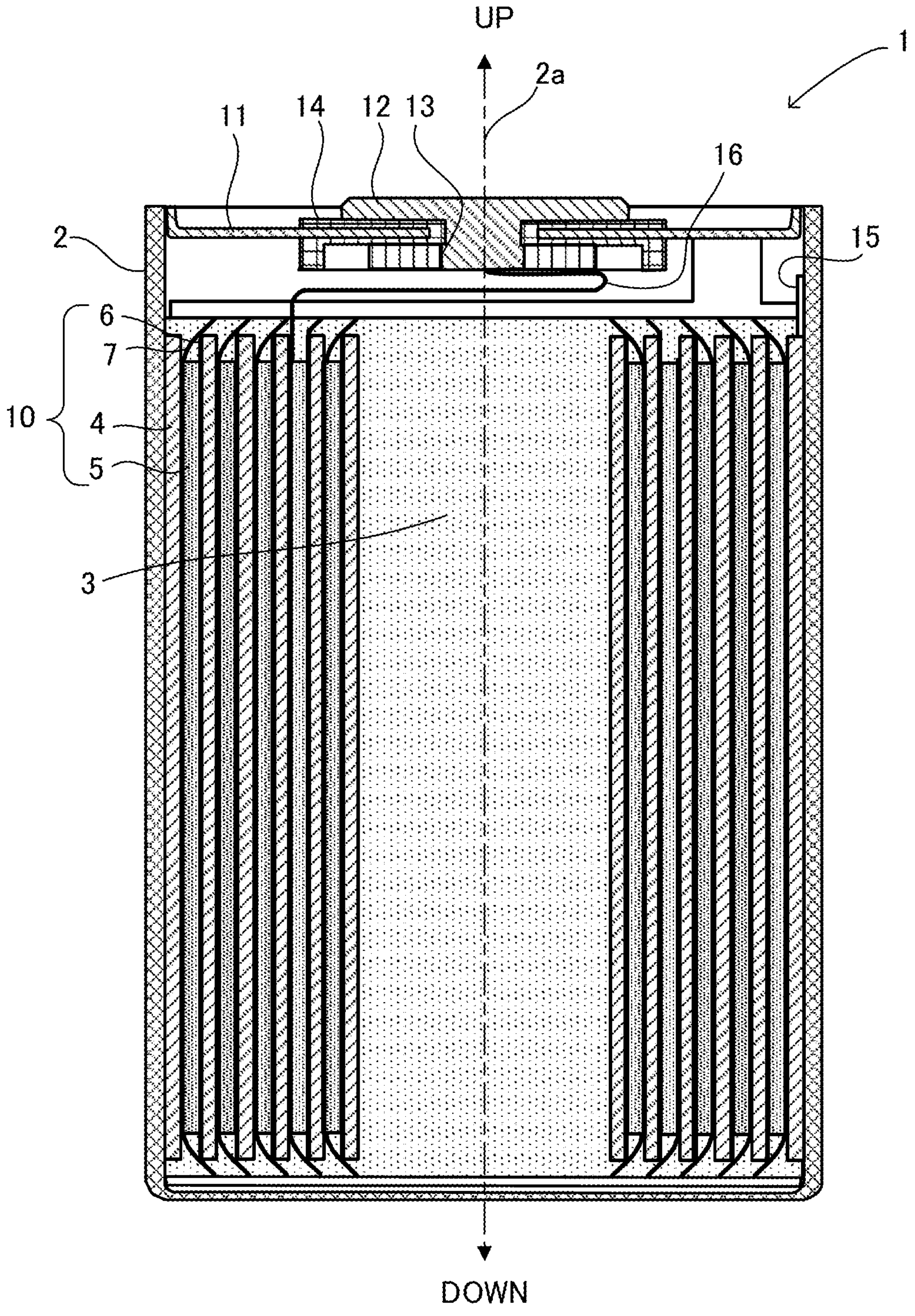
FIG. 1 is a cross-sectional view of an example of a cylindrical non-aqueous electrolyte battery according to an embodiment.

FIG. 1 is a cross-sectional view of an example of a cylindrical non-aqueous electrolyte battery according to the embodiment.

A non-aqueous electrolyte battery 1 is, for example, a lithium primary battery using a lithium metal or alloy as a negative electrode active material and manganese dioxide, copper oxide or the like as a positive electrode active material. Note however that the non-aqueous electrolyte battery 1 may be a lithium secondary battery or the like using graphite, silicon or the like as a negative electrode active material and lithium cobalt oxide ($LiCoO_2$) or the like as a positive electrode active material.

The non-aqueous electrolyte battery 1 includes an electrode body 10 housed, in a bottomed cylindrical battery can 2, in a spirally wound arrangement together with a non-aqueous electrolyte 3. The electrode body 10 is spirally wound around a cylindrical shaft 2*a* of the battery can 2 serving as a winding shaft.

The electrode body 10 includes a sheet-like positive electrode 4, a sheet-like negative electrode 5, and separator laminates 6 and 7 having therebetween one of the positive electrode 4 and the negative electrode 5 (the negative electrode 5 in the example of FIG. 1) and welded to each other by weld regions extending along two sides in a longitudinal direction, as described later.

The non-aqueous electrolyte 3 is obtained by adding an additive to a non-aqueous solvent. As the non-aqueous solvent, for example, a mixture of propylene carbonate (PC), ethylene carbonate (EC), and 1,2-dimethoxyethane (DME) in a weight ratio of PC:EC:DME=10:10:80 may be used. As for the additive, for example, a supporting salt may be used, such as lithium trifluoromethanesulfonate ($LiCF_3SO_3$), lithium hexafluorophosphate ($LiPF_6$), lithium tetrafluoroborate ($LiBF_4$), and lithium perchlorate ($LiClO_4$).

The positive electrode 4 is obtained, for example, by rolling a positive electrode compound (e.g., a mixture of a positive electrode active material, a conductive material, and a binder) onto a core body, which is then cut into a predetermined size and dried to form a sheet. As the core body, for example, a lath board, a plain weave wire mesh, an expanded metal, or a metallic foil is used. It is desirable that the material of the core body exhibit corrosion resistance to positive electrode potentials. Examples of such a material include, but are not limited to, SUS316 and SUS444.

The negative electrode 5 is prepared by forming a lithium metal or alloy into a sheet. Examples of the lithium alloy used include a lithium-aluminum (Al) alloy, a lithium-magnesium (Mg) alloy, a lithium-tin (Sn) alloy, a lithium-zinc (Zn) alloy, a lithium-antimony (Sb) alloy, and a lithium-silicon (Si) alloy.

Note that a metal to be alloyed with lithium may be deposited on the surface of the negative electrode 5 to form an alloy layer thereon. For example, an aluminum foil is placed on the surface of the negative electrode 5 to allow it to be alloyed with lithium. In addition, the metal deposited on the surface of the negative electrode 5 is not particularly limited as long as it is an element to be alloyed and, for example, magnesium, tin, zinc, silicon or the like may be used. Further, the form of the metal laid on the surface of the negative electrode 5 is not limited to a foil, but may be a plate, powder, or a product obtained by processing such a material.

An example of the separator laminates 6 and 7 will be described later (see FIG. 2).

The non-aqueous electrolyte battery 1 further includes a sealing plate 11, a negative electrode terminal 12, a metal washer 13, a resin gasket 14, a positive electrode tab 15, and a negative electrode tab 16.

The sealing plate 11 has a disk-shaped portion with an opening in the center, and the rim of the disk-shaped portion is bend upward. The negative electrode terminal 12 and the washer 13 are swaged together via the gasket 14. The rim of the sealing plate 11 and the upper rim of the battery can 2 are welded by laser welding or the like. As a result, the can mouth of the battery can 2 is closed hermetically to thus seal off the inside of the battery can 2.

The negative electrode 5 and the bottom surface of the negative electrode terminal 12 are electrically connected via the negative electrode tab 16. The positive electrode 4 and the inner surface of the battery can 2 are electrically connected via the positive electrode tab 15.

Figure 2:
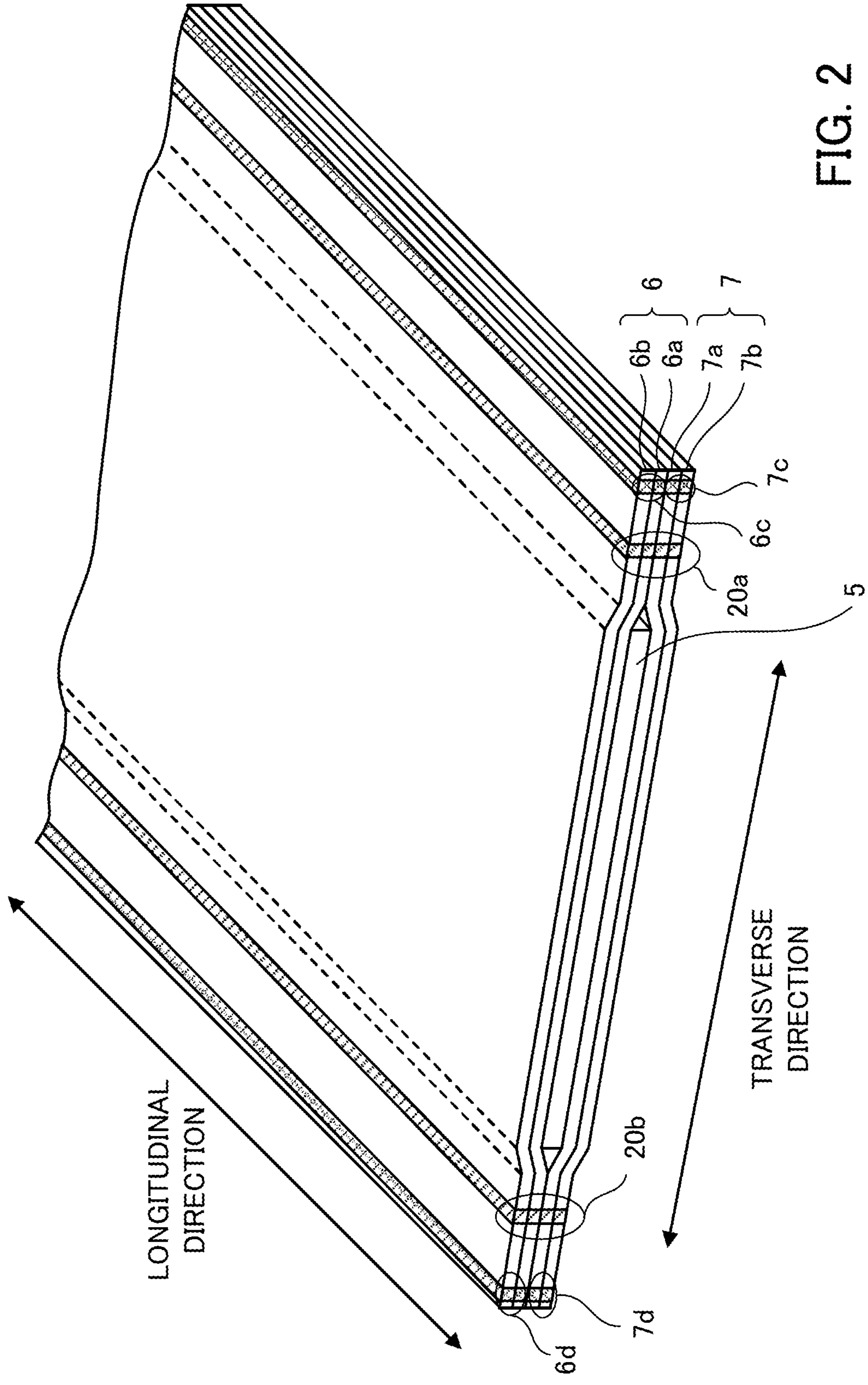
FIG. 2 is a perspective view illustrating an example of separator laminates.

FIG. 2 is a perspective view illustrating an example of separator laminates. FIG. 2 depicts a part of the separator laminates 6 and 7 in a longitudinal direction, before being spirally wound.

In the example of FIG. 2, the separator laminate 6 has a layered structure formed of two separators 6*a* and 6*b* while the separator laminate 7 also has a layered structure formed of two separators 7*a* and 7*b*. Note however that each of the separator laminates 6 and 7 may have a layered structure formed of three or more separators.

The separators 6*a* and 6*b* are welded to each other by a weld region 6*c* provided along a first side in the longitudinal direction and a weld region 6*d* provided along a second side opposing the first side. Similarly, the separators 7*a* and 7*b* are welded to each other by a weld region 7*c* provided along the first side in the longitudinal direction and a weld region 7*d* provided along the second side opposing the first side.

In addition, the separator laminates 6 and 7 are welded to each other across the negative electrode 5 by a weld region 20*a* extending in the longitudinal direction along the first side and a weld region 20*b* extending along the second side opposing the first side.

None of the weld regions 6*c*, 6*d*, 7*c*, 7*d*, 20*a*, and 20*b* is provided in such a manner as to oppose the top surface (and the bottom surface) of the negative electrode 5.

The separators 6*a* and 7*a* are, for example, microporous films made of polyolefin while the separators 6*b* and 7*b* are made of a non-woven fabric (e.g., a sheet-like resin non-woven fabric, such as a polypropylene non-woven fabric) having a melting point higher than that of the separators 6*a* and 7*a*. Examples of such a resin non-woven fabric used include polyethylene, polypropylene, polyethylene terephthalate (PET), polybutylene terephthalate (PBT), and cellulose. The microporous films preferably have a lower shutdown temperature.

Welding of the weld regions 6*c*, 6*d*, 7*c*, and 7*d* is conducted in advance, and then welding of the weld regions 20*a* and 20*b* is conducted with the negative electrode 5 sandwiched between the separator laminates 6 and 7.

As the welding method, ultrasonic welding is preferable; however, a different method, such as heat welding, may also be used. Note that welding in the transverse direction of the separator laminates 6 and 7 does not need to be done because misalignment or the like in the separators is less likely to occur in the transverse direction compared to the longitudinal direction. Having said that, for applications where higher safety is desired, welding in the transverse direction of the separator laminates 6 and 7 may be conducted.

In addition, the weld regions 20*a* and 20*b* do not need to be provided over the entire length of the separator laminates 6 and 7 in the longitudinal direction. Non-welded sections for bringing out the negative electrode tab 16 depicted in FIG. 1 and for reducing winding wrinkles may be provided (see FIG. 8). As will be described later, appropriate provision of non-welded sections is expected to reduce winding wrinkles and to enhance the absorption (absorption rate) of the non-aqueous electrolyte 3. Note that the weld regions 6*c*, 6*d*, 7*c*, and 7*d* do not need to be provided throughout the length of the separator laminates 6 and 7 in the longitudinal direction (see FIG. 9).

As described above, according to the non-aqueous electrolyte battery 1 of the embodiment, two or more separators (two in the case of FIG. 2) are interposed between the positive electrode 4 and the negative electrode 5. This contributes to providing more space for the non-aqueous electrolyte 3 to be held compared to the case with one separator only. For example, the non-aqueous electrolyte 3 is also retained in the space between the separators 6*a* and 6*b* and the space between the separators 7*a* and 7*b*. This prevents electrolyte shortage in the separators, which allows the non-aqueous electrolyte battery 1 to maintain its large current characteristics.

In addition, in the non-aqueous electrolyte battery 1, the negative electrode 5 is sandwiched between the separator laminate 6 formed of the separators 6*a* and 6*b* fixed by the weld regions 6*c* and 6*d* and the separator laminate 7 formed of the separators 7*a* and 7*b* fixed by the weld regions 7*c* and 7*d*, and the separator laminates 6 and 7 are welded together by the weld regions 20*a* and 20*b*. Herewith, it is possible to suppress shrinkage of the separators 6*a*, 6*b*, 7*a*, and 7*b* due to sudden temperature rises and prevent short-circuiting caused by misalignment due to impact, vibration or the like, thus improving safety.

Further, the separator laminates 6 and 7 have the separators 6*b* and 7*b* which are made of a non-woven fabric with a melting point higher than that of the microporous films of the separators 6*a* and 7*a*, which suppresses shrinkage of the separator laminates 6 and 7 due to temperature rises and therefore allows the separator laminates 6 and 7 to maintain their shapes.

By arranging the separators 6*a* and 7*a*, which are made of microporous films with a melting point lower than that of the separators 6*b* and 7*b*, so as to be in contact with the negative electrode 5, the microporous films become dissolved. This facilitates thermal fusion between the separator laminates 6 and 7, which in turn contributes to better productivity.

The provision of the weld regions 6*c*, 7*c*, and 20*a* and the weld regions 6*d*, 7*d*, and 20*b* at different locations in the transverse direction makes welding easier, which prevents problems such as unintentionally creating holes in the separator laminates 6 and 7 during welding.

Assessment Results of Battery Characteristics

Next described are assessment results of battery characteristics of the non-aqueous electrolyte battery 1, obtained by varying the types of the separators 6*a*, 6*b*, 7*a*, and 7*b*, and the positions and configurations of the weld regions 6*c*, 7*c*, 20*a*, and 20*b*.

Note that the non-aqueous electrolyte batteries 1 used for the assessment are cylindrical lithium primary batteries with a diameter of 17 mm and a height of 33.5 mm. To fabricate the positive electrode 4, a positive electrode compound is prepared by mixing electrolytic manganese dioxide (EMD), a conductive material (carbon (C)), and a fluorine-based binder at a mass ratio of 90:5:5. The positive electrode compound thus made is rolled onto a lath core body, then cut to a predetermined size, and dried to form a sheet, which is used as the positive electrode 4. The negative electrode 5 is a lithium-aluminum alloy. The non-aqueous electrolyte 3 is obtained by adding 0.5 M of a lithium trifluoromethanesulfonate supporting salt as a supporting salt to a mixture of propylene carbonate, ethylene carbonate, and 1,2-dimethoxyethane at a weight ratio of PC:EC:DME=10:10:80.

Welding of the weld regions 6*c*, 7*c*, 20*a*, 20*b* is performed by ultrasonic welding.

Assessed battery characteristics are discharge capacity; the number of free-fall drops in a free fall test until a voltage dip occurs in the non-aqueous electrolyte battery 1; and an electrolyte absorption rate at the weld regions 20*a* and 20*b* when the non-aqueous electrolyte passes through and permeates the weld regions 20*a* and 20*b*.

To check the discharge capacity, a 560-Ω resistor is used as a load. The free fall test is conducted under the same conditions regarding the Z-axis direction in Test J specified in the International Electrotechnical Commission (IEC) 60086. The electrolyte absorption rate is measured according to JIS L 1907/Byreck method.

Figure 3:
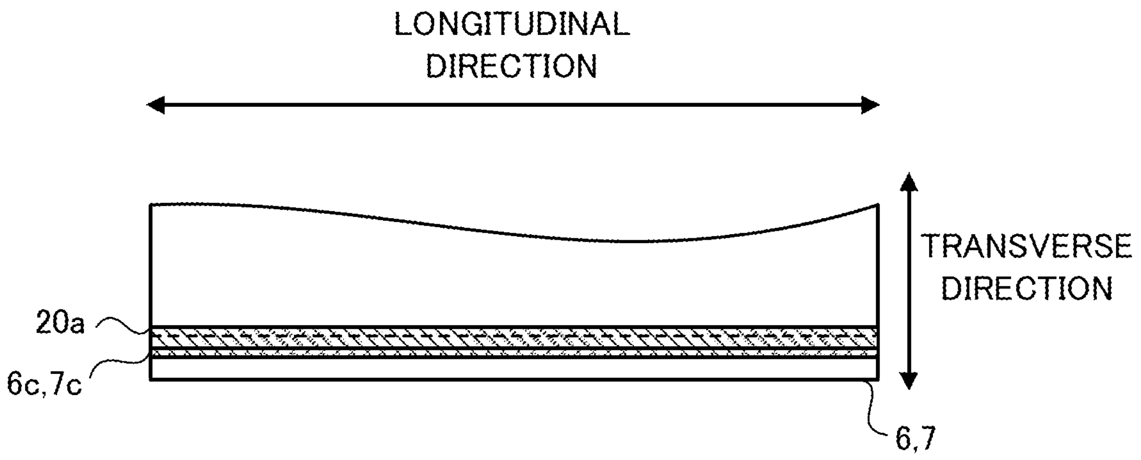
FIG. 3 illustrates a case where weld regions in each of which two separators of a separator laminate are welded together and a weld region in which two separator laminates are welded together overlap one another in a transverse direction.

FIG. 3 illustrates a case where weld regions in each of which two separators of a separator laminate are welded together and a weld region in which two separator laminates are welded together overlap one another in a transverse direction. FIG. 3 depicts an example where the weld regions 6*c* and 7*c* and the weld region 20*a* overlap one another in the transverse direction. Note that FIG. 3 omits the weld regions 6*d*, 7*d*, and 20*b*.

FIG. 4 represents assessment results of differences in characteristics depending on the presence or absence of overlap between two types of weld regions. Comparative Example 1 of FIG. 4 represents a case where the two types of weld regions, i.e., the weld regions in each of which two separators of a separator laminate are welded together (the weld regions 6*c* and 7*c* in the example of FIG. 3) and the weld region in which two separator laminates are welded together (the weld region 20*a* in the example of FIG. 3), overlap (i.e., they are located at the same position) in the transverse direction. On the other hand, Working Example 1 represents a case where those two types of weld regions have no overlap (they are located at different positions) in the transverse direction (i.e., the case depicted in FIG. 2).

In Comparative Example 1, tears and holes were found in the separator laminates 6 and 7 during welding of the weld regions 20*a* and 20*b*. In addition, the number of free-fall drops in the free fall test until a voltage dip occurred in the non-aqueous electrolyte battery 1 was 500. As for Comparative Example 1, it is considered that the shape of each weld region was made unstable because of the overlap between the two types of weld regions, and an internal short circuit occurred due to misalignment in the separators 6*a*, 6*b*, 7*a*, and 7*b* caused by the free fall drops, which would be likely to give rise to a voltage dip.

On the other hand, in Working Example 1, no tears and holes were found in the separator laminates 6 and 7 during welding of the weld regions 20*a* and 20*b*. In addition, the number of free-fall drops in the free fall test until a voltage dip occurred in the non-aqueous electrolyte battery 1 was 2900. As for Working Example 1, the weld regions 6*c* and 7*c* and the weld region 20*a*, as well as the weld regions 6*d* and 7*d* and the weld region 20*b*, were provided at different positions in the transverse direction. It is considered that the provision of these weld regions at different positions in the transverse direction made the welding work easy, which in turn made problems, such as holes and the like, less likely to occur. Therefore, it is understood that Working Example 1 is less likely to cause an internal short circuit and hence offers high safety.

FIG. 5 represents confirmatory results of differences in characteristics depending on the number of separators and the presence or absence of welding. In FIG. 5, Comparative Example 2 represents a case of using the separators 6*a* and 7*a*, which are microporous polyethylene films having a thickness of 15 μm and a melting point of 120° C. but not using the separators 6*b* and 7*b*. Comparative Example 3 represents a case of using the same separators 6*a* and 7*a* as those of Comparative Example 2 and the separators 6*b* and 7*b*, which are polypropylene non-woven fabric having a thickness of 35 μm and a melting point of 165° C. Note that, in Comparative Example 3, each pair of the separators 6*a* and 6*b* and the separators 7*a* and 7*b* is not bonded to each other by welding. Working Example 1 of FIG. 5 represents a case of using the same separators 6*a* and 7*a* as those of Comparative Examples 2 and 3 and the same separators 6*b* and 7*b* as those of Comparative Example 3. Note that, in Working Example 1, each pair of the separators 6*a* and 6*b* and the separators 7*a* and 7*b* is bonded to each other by welding (i.e., the case depicted in FIG. 2).

The discharge capacity was 1550 mAh in Comparative Example 2 where the separators 6*b* and 7*b* were not used, whereas it increased to 1700 mAh both in Comparative Example 3 and Working Example 1 where the separators 6*b* and 7*b* were used in addition to the separators 6*a* and 7*a*. This is considered to be the effect of the non-aqueous electrolyte 3 being held in the space between the separators 6*a* and 6*b* and between the separators 7*a* and 7*b*, thereby avoiding electrolyte shortage.

On the other hand, in the free fall test, the number of free-fall drops in the free fall test until a voltage dip occurred in the non-aqueous electrolyte battery 1 was 500 in Comparative Examples 2 and 3, whereas it was 2900 in Working Example 1. This is considered to be the effect of each pair of the separators 6*a* and 6*b* and the separators 7*a* and 7*b* being bonded to one another by welding, which prevented misalignment in the separators 6*a,* 6*b,* 7*a,* and 7*b* otherwise caused by impact and vibration due to free fall drops.

That is, it can be seen that high safety is achieved by bonding individually the separators 6*a* and 6*b* at the weld regions 6*c* and 6*d* and the separators 7*a* and 7*b* at the weld regions 7*c* and 7*d* by welding.

Next described are assessment results of changes in battery characteristics observed when varying the lengths of the two types of weld regions in the longitudinal direction.

Figure 6:
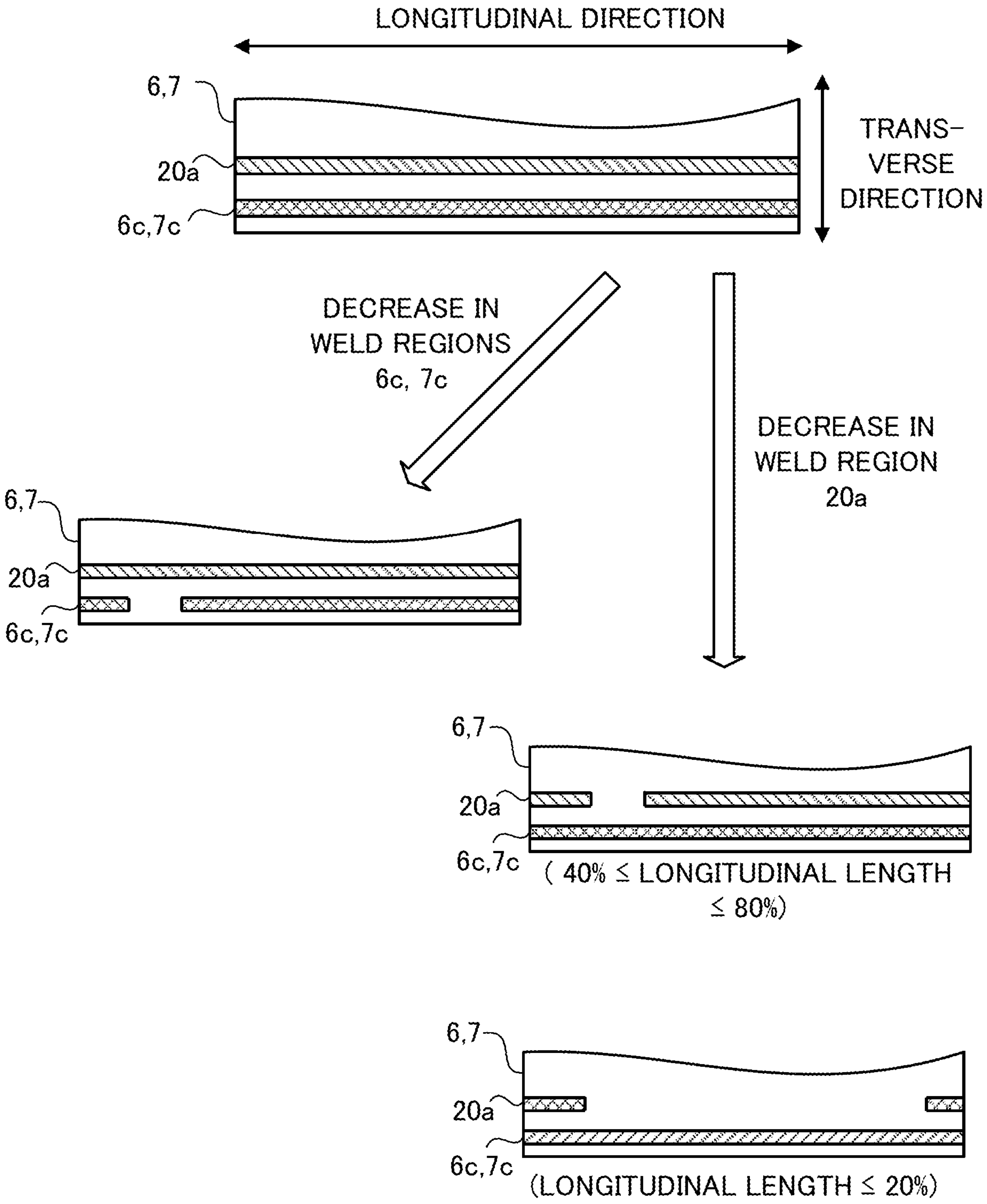
FIG. 6 depicts examples where lengths of the two types of weld regions in a longitudinal direction are varied.

FIG. 6 depicts examples where the lengths of the two types of weld regions in the longitudinal direction are varied.

FIG. 6 illustrates a case of reducing the weld regions 6*c* and 7*c* (i.e., reducing the lengths in the longitudinal direction) and a case of reducing the weld region 20*a* (reducing the length in the longitudinal direction). For the case of reducing the weld region 20*a,* two examples are provided, one with the length of the weld region 20*a* in the longitudinal direction being 40% or more and 80% or less of that of the separator laminates 6 and 7, and the other with the length of the weld region 20*a* in the longitudinal direction being 20% or less of that of the separator laminates 6 and 7.

Although FIG. 6 omits the weld regions 6*d,* 7*d,* and 20*b,* their lengths in the longitudinal direction may also be changed in the same manner.

FIG. 7 illustrates the electrolyte absorption rate, the discharge capacity, and free fall test results obtained by varying the lengths of the two types of weld regions in the longitudinal direction.

FIG. 7 represents eight examples each with a different percentage combination of the weld regions 6*c,* 6*d,* 7*c,* and 7*d* and the weld regions 20*a* and 20*b* along the longitudinal direction of the separator laminates 6 and 7. Note that the lengths of the weld regions 6*c,* 6*d,* 7*c,* 7*d,* 20*a,* and 20*b* in the transverse direction (i.e., the welding widths) are constant according to welding equipment used.

When one or more non-welded sections are partially included in a weld region along the longitudinal direction, the percentage of the weld region is obtained as: percentage (%)=(total length of portions of the weld region along the longitudinal direction without the non-welded sections/the length of the separator laminates 6 and 7 in the longitudinal direction)×100.

In Comparative Example 4, the above-described percentages of the two types of weld regions, i.e., the weld regions 6*c,* 6*d,* 7*c,* and 7*d* and the weld regions 20*a* and 20*b,* are both 100%. As for Working Examples 1 to 4 and Comparative Example 5, the percentage of the weld regions 6*c,* 6*d,* 7*c,* and 7*d* is 100%, whereas the percentage of the weld regions 20*a* and 20*b* is 80% in Working Example 1; 60% in Working Example 2; 40% in Working Example 3; 20% in Working Example 4; and 0% in Comparative Example 5. Note that one or more non-welded sections in the weld regions 20*a* and 20*b* are provided at the same positions in the longitudinal direction (see FIG. 8). In Comparative Examples 6 and 7, the percentage of the weld regions 20*a* and 20*b* is 100%, whereas the percentage of the weld regions 6*c,* 6*d,* 7*c,* and 7*d* is 80% in Comparative Example 6; and 40% in Comparative Example 7. Note that one or more non-welded sections in the weld regions 6*c* and 7*c* and the weld regions 6*d* and 7*d* are provided at the same positions in the longitudinal direction.

According to FIG. 7, the electrolyte absorption rate increases as the percentage of the weld regions 20*a* and 20*b* decreases, as is clear from the comparison of Comparative Examples 4 and 5 and Working Examples 1 to 4. This is because the non-aqueous electrolyte 3 infiltrates in the longitudinal direction, the infiltration rate is faster with a lower percentage of the weld regions 20*a* and 20*b.* The increased electrolyte absorption rate would contribute to a decrease in production man-hours.

Note however that a too small percentage of the weld regions 20*a* and 20*b* (for example, 20% in Working Example 4) yields poor results in the free fall test. Therefore, the percentage of the weld regions 20*a* and 20*b* is preferably in the range between 40% and 80%, inclusive (see FIG. 6).

On the other hand, as is clear from the comparison of Comparative Examples 4, 6, and 7, a decrease in the percentage of the weld regions 6*c,* 6*d,* 7*c,* and 7*d* has no impact on the electrolyte absorption rate, however, yields poorer results in the free fall test. Therefore, the percentage of the weld regions 6*c,* 6*d,* 7*c,* and 7*d* is preferably 100%. However, it is sometimes the case that the electrolyte absorption rate improves if the percentage of the weld regions 6*c,* 6*d,* 7*c,* and 7*d* is less than 100% and the percentage of the weld regions 20*a* and 20*b* is also less than 100% (see FIG. 9).

No differences were observed in the discharge capacity among the eight examples above.

Non-welded sections in the weld regions 20*a* and 20*b* are used for the purpose of bringing out the negative electrode tab 16 depicted in FIG. 1 or reducing winding wrinkles, as described above.

Figure 8:
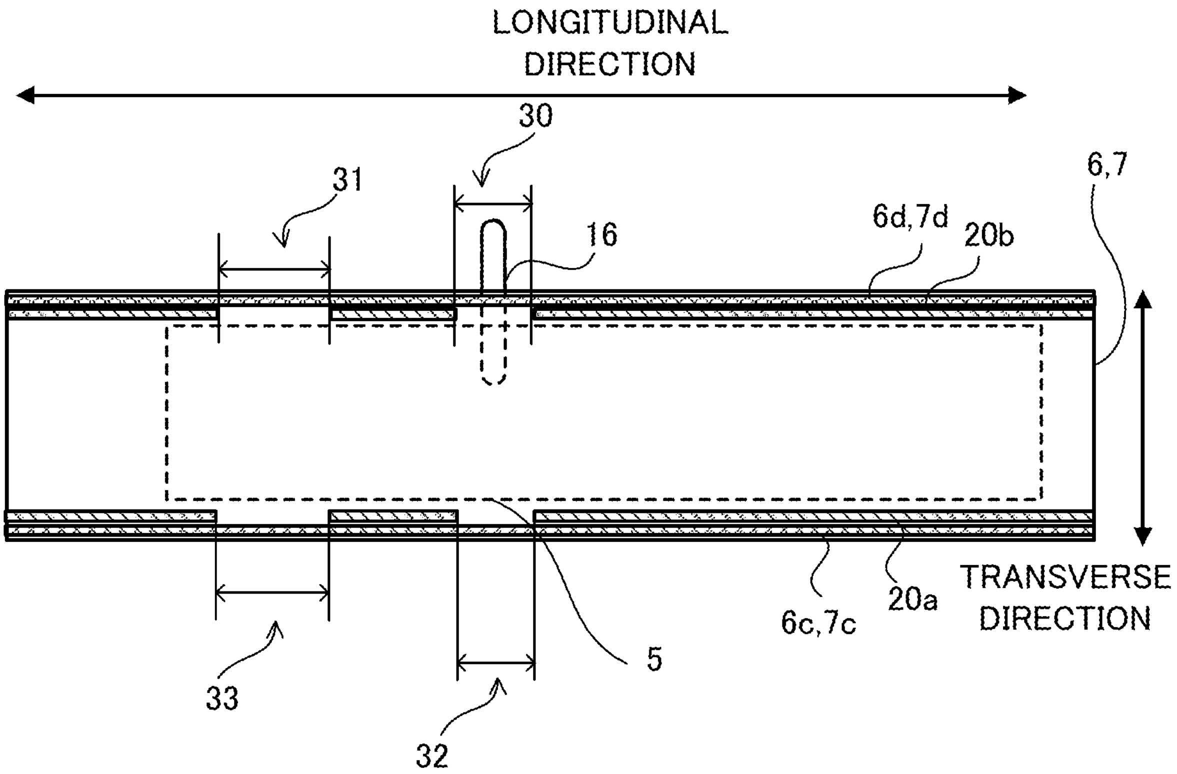
FIG. 8 illustrates a usage example of non-welded sections.

FIG. 8 illustrates an example of use of non-welded sections.

In the example of FIG. 8, non-welded sections 30 and 31 are provided, which include no weld region 20*b,* and the negative electrode tab 16 electrically connected to the negative electrode 5 is brought out of the bonded structure of the separator laminates 6 and 7 via the non-welded section 30.

On the other hand, the non-welded section 31 has a function of reducing winding wrinkles.

Also on the weld region 20*a* side, a non-welded section 32 having the same length as that of the non-welded section 30 is provided at the same position in the longitudinal direction as the non-welded section 30, and a non-welded section 33 having the same length as that of the non-welded section 31 is provided at the same position in the longitudinal direction as the non-welded section 31.

Modifications

Figure 9:
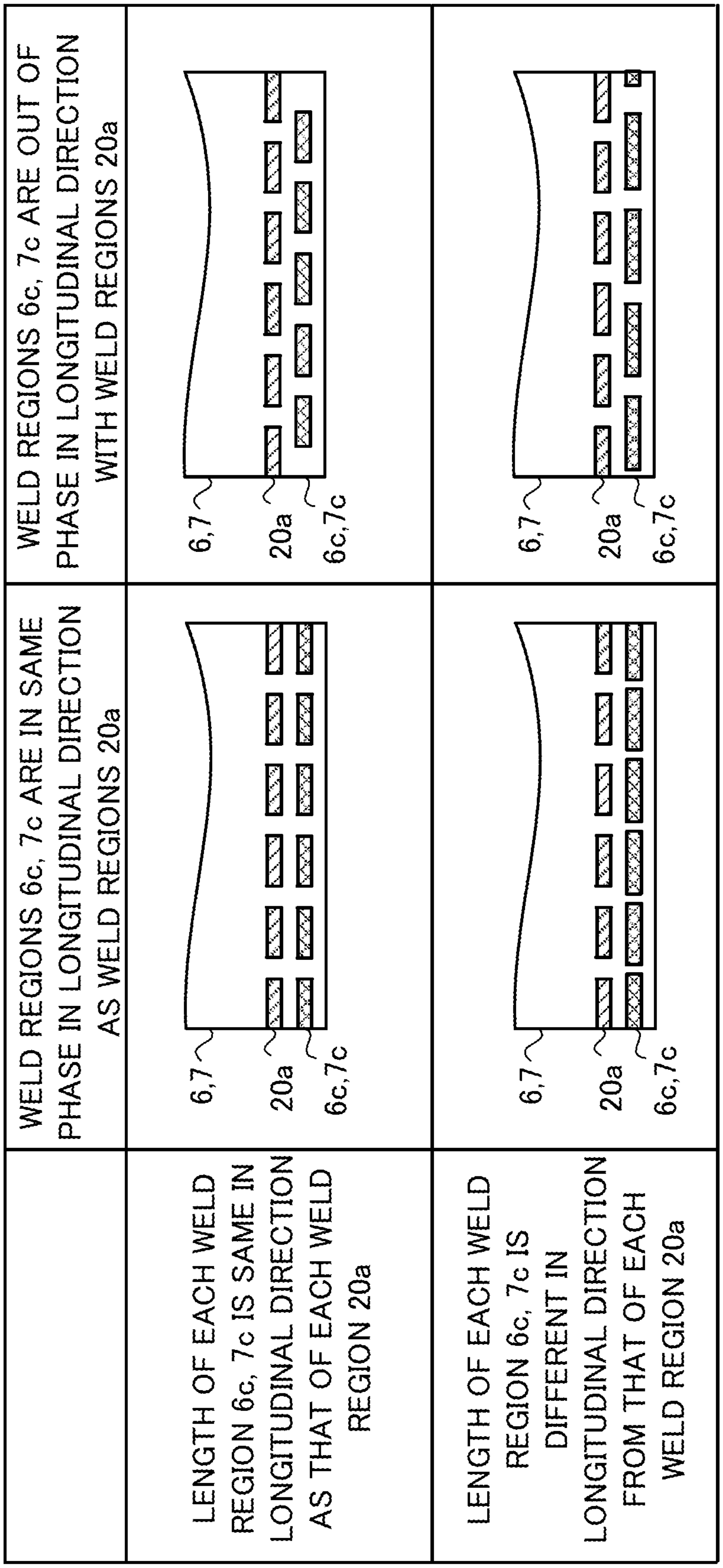
FIG. 9 illustrates modifications.

FIG. 9 illustrates modifications.

FIG. 9 depicts four modifications in all of which the weld regions 6*c* and 7*c* and the weld regions 20*a* are provided in an intermittent manner at intervals in the longitudinal direction. The four modifications are combinations of whether or not the length of each weld region 6_c_ and 7_c_ in the longitudinal direction is the same as that of each weld region 20_a_ in the longitudinal direction and whether or not the weld regions 6_c_ and 7_c_ are in the same phase in the longitudinal direction as the weld regions 20_a_.

Using these four modifications, assessment of the electrolyte absorption rate and the free fall test depicted in FIG. 7 was conducted. No significant differences were found in the results of the free fall test among the four modifications.

As for the electrolyte absorption rate, on the other hand, the modification in which the length of each weld region 6_c_ and 7_c_ is the same in the longitudinal direction as that of each weld region 20_a_ and the weld regions 6_c_ and 7_c_ are in the same phase in the longitudinal direction as the weld regions 20_a_ (i.e., non-welded sections associated with the weld regions 6_c_ and 7_c_ are located at the same positions in the longitudinal direction as those associated with the weld regions 20_a_) exhibited the fastest electrolyte absorption rate. This was followed by the two modifications with the length of each weld region 6_c_ and 7_c_ in the longitudinal direction being different from that of each weld region 20_a_.

Note that FIG. 9 omits the weld regions 6_d_, 7_d_, and 20_b_; however, the same goes with these weld regions.

Having described aspects of the non-aqueous electrolyte battery based on the embodiment above, they are merely examples and the particular details of these illustrative examples shall not be construed as limitations on the appended claims.

For example, in the above description, the negative electrode 5 is sandwiched between the separator laminates 6 and 7, as illustrated in FIG. 2; however, the positive electrode 4 may be interposed between the separator laminates 6 and 7 instead. In that case, in the non-aqueous electrolyte battery 1 of FIG. 1, the negative electrode 5 in a spirally wound arrangement is located on the outermost periphery of the electrode body 10 housed in the battery can 2. Then, a positive electrode tab electrically connected to the positive electrode 4 is used in place of the negative electrode tab 16; a negative electrode tab electrically connected to the negative electrode 5 is used in place of the positive electrode tab 15; and a positive electrode terminal is used in place of the negative electrode terminal 12.

According to one aspect, a highly safe non-aqueous electrolyte battery capable of preventing electrolyte shortage in the separators is offered.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that various changes, substitutions, and alterations could be made hereto without departing from the spirit and scope of the disclosure.

What is claimed is:

1. A non-aqueous electrolyte battery comprising:
an electrode body configured to be housed, in a cylindrical battery can, in a spirally wound arrangement, wherein:
the electrode body includes:
a sheet-like positive electrode and a sheet-like negative electrode; and
a first separator laminate and a second separator laminate, between which one of the positive electrode and the negative electrode is interposed, and which are welded together by ultrasonic welding or heat welding at a first weld region provided along a first side in a longitudinal direction and a second weld region provided along a second side in the longitudinal direction opposing the first side;
wherein the first separator laminate has two or more separators welded together by ultrasonic welding or heat welding at a third weld region provided along the first side and a fourth weld region provided along the second side;
the second separator laminate has two or more separators welded together by ultrasonic welding or heat welding at a fifth weld region provided along the first side and a sixth weld region provided along the second side, the fifth weld region being disposed in contact with the third weld region in a non-welded state, and the sixth weld region being disposed in contact with the fourth weld region in a non-welded state;
the third weld region and the fifth weld region are disposed outside a first outer edge, in a transverse direction of the first separator laminate and the second separator laminate, of the one of the positive electrode and the negative electrode, and
the fourth weld region and the sixth weld region are disposed outside a second outer edge, in the transverse direction, of the one of the positive electrode and the negative electrode, the second outer edge opposing the first outer edge.

2. The non-aqueous electrolyte battery according to claim 1, wherein:
the third weld region and the fifth weld region are located at positions different, in a transverse direction of the first separator laminate and the second separator laminate, from the first weld region, and
the fourth weld region and the sixth weld region are located at positions different, in the transverse direction, from the second weld region.

3. The non-aqueous electrolyte battery according to claim 1, further comprising:
a tab configured to be electrically connected to one of the positive electrode and the negative electrode, wherein:
a first non-welded section and a second non-welded section, including none of the first weld region or the second weld region, are arranged in the longitudinal direction of the first separator laminate and the second separator laminate, and
the tab is extended out of a bonded structure formed of the first separator laminate and the second separator laminate, through the first non-welded section.

4. The non-aqueous electrolyte battery according to claim 1, wherein:
a length of each of the first weld region and the second weld region in the longitudinal direction is 40% or more and 80% or less of a length of each of the first separator laminate and the second separator laminate in the longitudinal direction.

5. The non-aqueous electrolyte battery according to claim 1, wherein:
the two or more separators include at least a first separator formed of a microporous film and a second separator formed of a non-woven fabric, and the second separator has a higher melting point than the first separator.

6. The non-aqueous electrolyte battery according to claim 5, wherein:

out of the first separator and the second separator, the first separator is in contact with the one of the positive electrode and the negative electrode.

7. The non-aqueous electrolyte battery according to claim 1, wherein:

the negative electrode includes a lithium metal or alloy, and the first separator laminate and the second separator laminate are welded to each other across the negative electrode.

8. The non-aqueous electrolyte battery according to claim 1, wherein:

the third weld region and the fifth weld region are disposed closer to an edge on the first side than the first weld region, and the fourth weld region and the sixth weld region are disposed closer to an edge on the second side than the second weld region.

* * * * *